3,080,526
APPARATUS FOR SIMULATING PULSE SIGNALS GENERATED BY A PAM/PDM COMMUTATOR
John H. Porter, Tarzana, Calif., assignor to Crestmont Consolidated Corporation, San Marino, Calif., a corporation of California
Filed Apr. 28, 1961, Ser. No. 106,345
12 Claims. (Cl. 328—187)

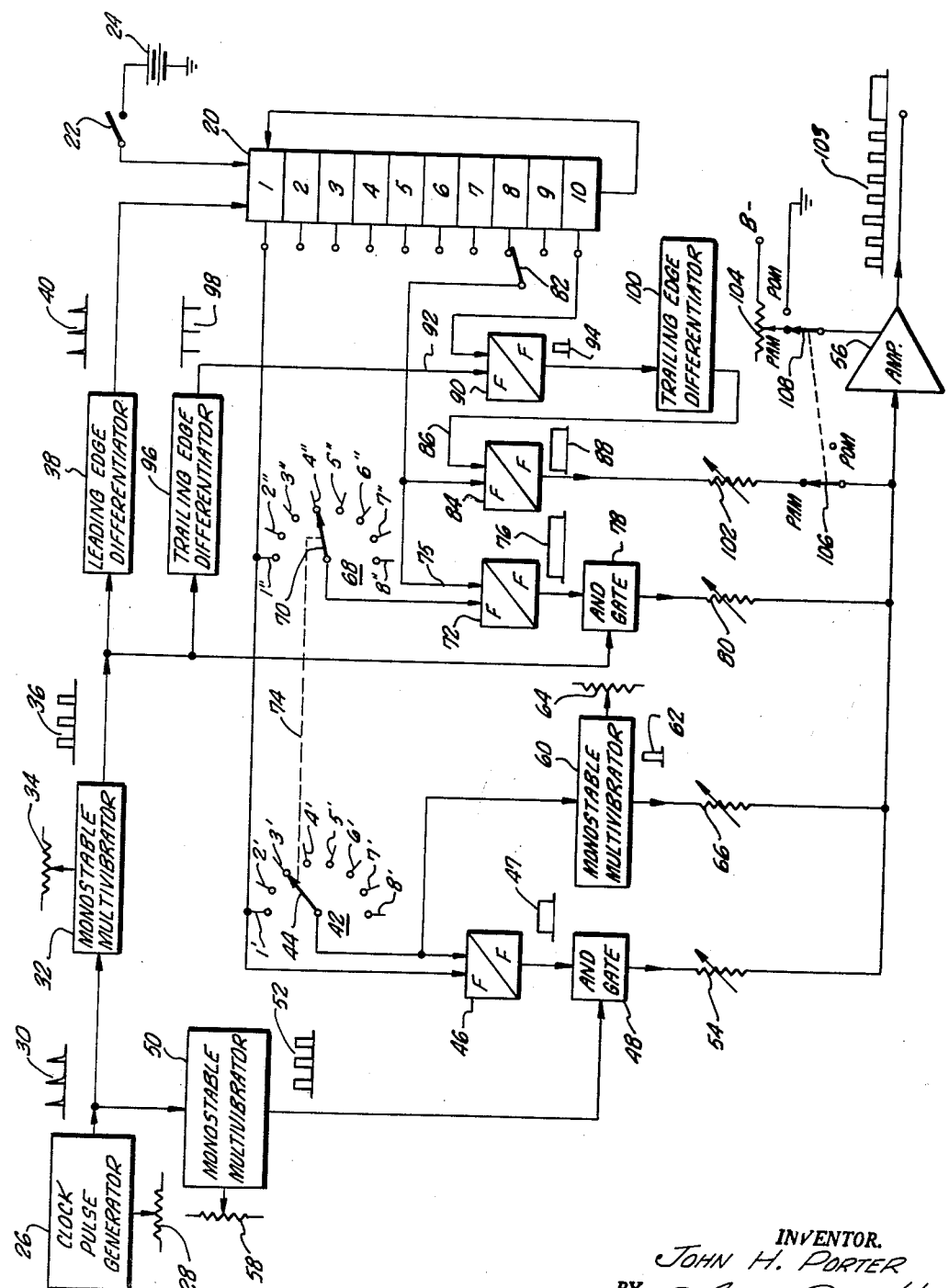

This invention relates to pulse train generating apparatus, and, more particularly, to a novel arrangement for simulating time division pulse signals generated by a commutator.

In many industrial as well as military operations, it is desired to obtain data from a remote object or vehicle, such as a moving aircraft, which is indicative of many different conditions presently existing at the object or vehicle. One method of obtaining such data is by radio telemetry. Generally in telemetering systems, information representing conditions at a remote vehicle is transmitted from the vehicle to a receiver location in the form of pulse amplitude or pulse duration modulated signals (PAM or PDM). These pulse modulated signals are generally produced by operation of a commutator arrangement located at the vehicle. In general, the commutator arrangement of a telemetering system includes a plurality of electrical input terminals, each input terminal being coupled to a transducer arrangement which is positioned to develop an electrical signal indicative of a particular condition existing at the vehicle. By operation of the commutator, the electrical signals developed by the transducer arrangements are serially sampled to produce a train of pulse signals, each pulse representing in amplitude or width the condition sensed by a particular transducer and each cycle of the commutator defining a frame of pulses. Accordingly, if the vehicle includes transducer arrangements detecting ten different conditions at the vehicle, each pulse frame has ten plus one discrete pulses, the additional pulse being a master pulse which represents either the beginning or the end of the frame. The train of pulses generated by the commutator operation is then utilized to modulate a carrier wave to produce either a PAM or PDM signal depending upon the type of modulation employed.

As previously indicated, the PAM or PDM signal being developed by the commutator arrangement at the vehicle is then transmitted to a receiving station. Generally, the receiving station includes a decommutator arrangement which operates in synchronism with the commutator arrangement to detect the condition of the vehicle indicated by the amplitude or width of the pulses in each pulse frame. In general, the decommutator includes a single input for receiving the PAM or PDM signal generated at the vehicle, means for demodulating the signal, and a plurality of output stages, one corresponding to each transducer arrangement of the vehicle. These output stages are in turn connected to discrete output terminals of the decommutator.

Briefly, in operation, upon receiving a signal from the vehicle, the decommutator demodulates the signal. A master pulse of the train of pulse signals is then recognized which in turn identifies the succeeding pulses of each pulse frame. Each pulse in a pulse frame is then gated to an output stage of the decommutator associated with the transducer arrangement which originated the pulse signal. These gated pulse signals are then sensed at associated output terminals to determine the particular conditions detected by the transducer arrangements.

As is commonly known, the operation of telemetering equipment in connection with such projects as the monitoring of flight conditions for test aircraft is quite critical. Accordingly, prior to the actual test, it is generally the practice to check out both the decommutator arrangement and the transmission link between the test vehicle and the receiving location. After the telemetering equipment is connected to the test vehicle, however, it is undesirable to induce changes in the conditions being monitored by the transducer arrangements to check out the telemetering system. In view of this, the present invention provides inexpensive apparatus including a minimum of components for generating a train of pulses which accurately simulate the pulse train produced by operation of the commutator arrangement.

In particular, the present invention includes apparatus which develops a train of pulses having a plurality of pulse frames, each pulse frame including a number of independent pulses conforming to the number of transducer arrangements on the test vehicle, and a master pulse. Further, the apparatus includes means for independently varying the time duration and/or amplitude of any one of the independent pulses. Accordingly, the present invention may be utilized at the test vehicle to generate a PAM or a PDM signal wherein an operator may vary any pulse in width and/or amplitude. These changes in pulse width and amplitude may then be detected at the receiving location. By knowing the magnitudes of the amplitude and width of the generated pulses, each stage of the decommutator arrangement as well as the interconnecting transmission link may be checked for accuracy of operation and any undesired interaction between the stages corrected.

In accomplishing the above, the present invention in a basic form includes a pulse generator for generating pulse signals of variable time duration coupled to drive a ring counter. In particular, the ring counter has a plurality of stages, a stage corresponding to each pulse of the pulse train to be generated.

To initiate a frame of pulse signals, means are included which are responsive to an excitation of the first stage of the counter for operating an electrical gating means, the closing of which is controlled by an excitation of the counter stage associated with the independently variable pulse signal. Thus, by applying the pulse signals generated by the pulse generator to the electrical gating means and hence to an amplitude control means, the number of independent pulse signals of the pulse frame preceding the independently variable pulse are passed by the gating means to an output amplifier.

To initiate the independently variable pulse signal, means are included for selecting one of the stages of the counter. An excitation of this stage functions to close the aforementioned electrical gate and to excite means for generating a single pulse signal having a variable time duration. This pulse signal is then applied to amplitude varying means and hence to the output amplifier in timed succession with the preceding pulses.

To initiate the remaining independent pulse signals of the pulse frame, means are included which are responsive to an excitation of the stage of the counter following the particular stage for reopening the gating means, the closing being controlled by an excitation of the counter stage associated with the initiation of the master pulse. Thus, the number of independent pulses which follow the independently variable pulse are passed through the gating means to the output amplifier.

To initiate the master pulse, means are included which are responsive to an excitation of the counter stage following the stage corresponding with the last independent pulse signal of the pulse frame for initiating a signal having a variable amplitude. In particular, in response to an excitation of this counter stage, a signal is generated, the duration of which is accurately controlled by an excitation of the last stage of the counter. Specifically, the duration of the master pulse is controlled by means which are responsive to the trailing edge of the pulse signal generated by the pulse generator which excites the last stage of the counter.

As previously mentioned, the present invention is adapted to produce either pulse amplitude or pulse duration modulated signals. Since, in pulse duration modulation, the master pulse is represented by a space of known duration, means are coupled to the output amplifier which, when the present invention is generating pulse duration modulated signals, produces a master pulse having a zero magnitude.

Further, when generating a train of pulses simulating a PAM output of a commutator arrangement, it may be desired to detect signals having a zero amplitude relative to the other pulse signals. Accordingly, the present invention includes means for inserting a negative pedestal into the output of the amplifier.

The above, as well as other features of the present invention may be more fully understood by reference to the following detailed description when considered with the drawing, the single FIGURE of which represents in block diagram form a preferred embodiment of the present invention.

As illustrated, the apparatus of the present invention includes a counter 20 having a plurality of count conditions which by way of example are represented by stages of the counter. By way of illustration only, the counter 20 is represented as including ten stages depicted by the numerals 1 through 10. Further, the counter 20 is illustrated as being a ring-type counter having an output terminal associated with each of its stages. As represented, the counter 20 is initially set by the operation of a switch 22 which applies a potential from the source 24 to the first stage of the counter 20.

To drive the counter 20, means are included for generating pulse signals. In particular, as illustrated, this includes a clock pulse generator 26. As represented by the variable resistance 28, the clock generator 26 has a variable repetition rate.

As illustrated, clock signals generated by the clock generator 26 (represented by the wave form 30) are applied to a monostable multivibrator 32. As represented by the variable resistance 34, the timing of the monostable multivibrator 32 is variable to produce pulse signals of a variable time duration. As is commonly known, such a variation may be perfected by varying the value of such a timing resistor of the multivibrator.

The output of the monostable multivibrator 32, represented by the wave form 36, is applied to a leading edge differentiator 38. The leading edge differentiator 38 differentiates the pulse signals generated by the multivibrator 32 to produce pulse signals corresponding to the leading edges of the pulses generated by the multivibrator 32, such as represented by the wave form 40. These leading edge signals are utilized to drive the counter 20. Accordingly, in response to each pulse generated by the clock generator 26 an accurately timed drive signal is generated to drive the counter 20. Thus, once the counter 20 is set by the momentary closing of the switch 22, each stage of the counter 1 through 10 will be excited in timed succession. Due to the ring arrangement of the counter 20, the excitation of the stage 10 of the counter causes the first stage of the counter 20 to be reset, thereby providing a cycling operation for the counter 20.

As briefly described above, to develop the desired pulse frame, the apparatus of the present invention includes means which are responsive to an excitation of particular stages of the counter 20 for opening and closing an electrical gate to allow particular pulses generated by a pulse generating means to pass in timed succession to an output amplifier. In particular, as mentioned, the opening of the gate is controlled by an excitation of the first stage of the counter and by an excitation of the stage of the counter following the stage corresponding to the independently variable pulse signal. Further, the closing of the gate is controlled by an excitation of the stage associated with the independently variable pulse and the stage following the stage corresponding to the last independent pulse of the pulse frame.

To provide means for selecting a stage of the counter to correspond to the independently variable pulse and hence to determine the particular pulse of the pulse frame which is independently variable as well as the opening and closing time of the electrical gate, a selector switch 42 is included. The selector switch 42 includes a wiper arm 44 and a plurality of contact points. As represented by the prime notation, a contact point is coupled to each of the stages 1 through 8 of the counter 20. Thus, by selectively positioning the wiper arm, a particular stage of the counter 20 to correspond to the independently variable pulse may be selected.

To generate the pulse signals of the pulse frame preceding the independently variable pulse, the first stage of the counter 20 as well as the wiper arm 44 is connected to a flip-flop 46. In particular, the flip-flop 46 is so constructed that when the first stage of the counter 20 is excited, the flip-flop 46 is switched to a "true" or "high" state and generates an output signal. The flip-flop 46 remains in this state until the state of the counter 20 to which the wiper arm 44 is positioned is excited. At this time the flip-flop 46 is caused to change to a "false" or "low" state and the output signal generated thereby is removed. In particular, the output of the flip-flop 46 is represented by the wave form 47. As represented, the output of the flip-flop 46 is applied to an "and" gate 48, the "and" gate having a second input from a monostable multivibrator 50.

The output of the clock generator 26 is applied to the monostable multivibrator 50 which, in response to the clock pulses generated by the clock generator 26, produces a pulse output of the form represented at 52. Thus, in response to the excitation of the first stage of the counter 20, flip-flop 46 is energized to open the "and" gate 48 which will remain open to pass pulses generated by the multivibrator 50 until the stage associated with the wiper arm 44 is energized. Accordingly, a number of pulse signals corresponding to the number of pulses preceding the independently variable pulse is passed by the "and" gate 48 through a variable resistor 54 to an output pulse amplifier 56. In particular, the number of pulses preceding the independently variable pulse is equal to the number of stages of the counter 20 which precede the stage associated with the independently variable pulse. Further, since the amplitude of the pulse signals passed by the "and" gate 48 is variable by adjusting the value of the resistor 54 and since, as represented by the variable resistor 58, the time duration of the pulses generated by the monostable multivibrator 50 is controllable, the group of pulse signals passed by the "and" gate 48 is variable both in amplitude and time duration.

To generate the independently variable pulse, the wiper arm 44 is connected to a monostable multivibrator 60. Thus, when the particular stage associated with the wiper arm 44 is energized, the "and" gate 48 is closed and the multivibrator 60 is excited. The excitation of the multivibrator 60 produces a single pulse signal such as that represented by the wave form 62. As represented by the variable resistor 64, the time duration of the pulse signal generated by the multivibrator 60 is controllable. Further, as represented by the variable resistor 66, amplitude of the pulse signal is independently variable. Also, due to the timing of the counter 20, the independently variable pulse generated by the multivibrator 60 is applied to the pulse amplifier 56 in timed succession with the pulses passed by the "and" gate 48.

To generate the remaining independent pulses of the pulse frame, a second selector switch represented at 68 is included. The selector switch 68 includes a wiper arm 70 and a plurality of contact points. As represented by the prime notation, a contact point is coupled to each of the stages 1 through 8 of the counter 20. As represented by the dotted line 74, the selector switches 42 and 68 may be simultaneously controlled. In particular, the wiper arm 70 is positioned one contact point ahead of the wiper arm 44. Thus, when the wiper arm 44 is impinging upon the contact point associated with the third stage of the counter 20, the wiper arm 70 is impinging upon the contact point associated with the fourth state of the counter 20.

As represented, the wiper arm 70 is coupled to a flip-flop 72. Thus, after the independently variable pulse has been generated by operation of the monostable multivibrator 60 and upon excitation of the stage following the stage associated with the independently variable pulse, the flip-flop 72 is excited. In particular, the flip-flop 72 is so constructed that when excited by a signal transmitted by the wiper arm 70 it is caused to switch to a "true" or "high" state and produce an output signal. The flip-flop 72 remains in this state until the input lead 75 is energized, at which time the flip-flop 72 is excited to a "false" or "low" state and the output signal generated thereby is terminated. The output of the flip-flop 72 is represented by the wave form 76.

As illustrated, the output of the flip-flop 72 is applied to an "and" gate 78. The "and" gate 78 functions to pass a pulse signal so long as the flip-flop is in a "true" state. In particular, the pulses generated by the multivibrator 32 are applied to the "and" gate 78. Thus when the flip-flop 72 is in a "true" state, pulses generated by the multivibrator 32 are passed by the "and" gate 78 through a variable resistor 80 to the output amplifier 56. Further, since the amplitude of the pulse signals passed by the "and" gate 78 is variable by adjusting the value of the resistor 80, and since the time duration of the pulse signals generated by the multivibrator is controllable, each of the pulse signals applied to the amplifier 56 in succession after the independently variable pulse generated by the multivibrator 60 is selectively variable in amplitude and time duration.

As previously indicated, the time duration of the "true" state of the flip-flop 72 is controlled by the excitation time of the input lead 75. As illustrated in the drawing, the excitation time of the lead 75 is controlled by one of the latter stages of the counter 20. In particular, depending upon the position of a switch 82, the flip-flop 72 will be caused to change to a "false" state upon an excitation of the stages 8 or 9 of the counter 20. Thus, with the switch 82 positioned as shown in the drawing, the flip-flop 72 is excited to a "true" state by an excitation of the fourth stage of the counter 20 and is caused to change to a "false" state by an excitation of stage 8 of the counter 20. Accordingly, since pulse signals representing the leading edges of the pulse signals applied to the "and" gate 78 drive the counter 20, four pulse signals generated by the multivibrator 32 are passed in succession by the "and" gate 78 to the output amplifier 56. These pulses represent the remaining independent pulse signals of the pulse frame being generated.

To generate the master pulse indicative of the end of a frame of pulses, the switch 82 is coupled to a flip-flop 84. In particular, the flip-flop 84 is so constructed that when the eighth or ninth stage of the counter 20 is energized, depending upon the position of switch 82, the flip-flop 84 is caused to switch to a "true" state and produce an output signal. The flip-flop 84 remains in this state until the input lead 86 is energized, at which time it switches to a "false" state and terminates the output signal. The output signal produced by the flip-flop 84 is represented by the wave form 88.

As is commonly known, the master pulse of a frame of pulse modulated signals is distinguished from the other independent pulses of the pulse frame by having a greater time duration. In accordance with the present invention, the duration of the master pulse is controlled by the operation of the last stage of the counter. As illustrated in the drawing, when the last stage of the counter is excited, a signal is applied to a flip-flop 90. Flip-flop 90 is so constructed that in response to the signal produced by an excitation of the last stage of the counter 20 it is caused to switch to a "true" stage and produce an output signal. The flip-flop 90 remains in this stage until the input lead 92 is energized, at which time the flip-flop 90 switches to a "false" state and terminates the output signal. The output pulse produced by the flip-flop 90 is represented by the wave form 94.

As represented in the drawing, the input lead 92 is energized from a trailing edge differentiator 96. The trailing edge differentiator operates upon the pulse signals generated by the multivibrator 32 to produce a pulse output such as that illustrated by the wave form 98. The pulses correspond to the trailing edge of the pulses generated by the multivibrator 32. Since the signals applied to the flip-flop 90 over the lead 92 represent the trailing edge of the pulses generated by the multivibrator 32 and since the stages of the counter 20 are excited by drive signals representing the leading edges of the pulses generated by the multivibrator 32, the flip-flop 90 produces a pulse signal having a duration which is accurately timed to conform to the time duration of a pulse signal generated by the multivibrator 32. In particular the pulse signal produced by the flip-flop 90 represents an accurate reproduction of the particular pulse the leading edge of which excited the last stage of the counter 20. As represented in the drawing, this pulse signal is applied to a trailing edge differentiator 100 which is in turn connected to the input lead 86 of the flip-flop 84. Thus, the trailing edge of the pulse which excites the last stage of the counter 20 is utilized to accurately control the time duration of the master pulse which is generated by the flip-flop 84. As represented, the master pulse thus generated is applied through a variable resistor 102, which controls the amplitude of the master pulse, to the output amplifier 56 in timed succession with the independent pulse signals previously generated.

Accordingly, due to the operation of the counter 20 to accurately excite the opening and closing of the "and" gates 48 and 78, a frame of pulses is generated, a first group of which are variable in amplitude and width followed by an independently variable pulse which is in turn followed by a second group of pulses variable in width and amplitude. These independent pulses are in turn followed in accurately timed succession by the master pulse, the time duration of which is determined by the position of the switch 82 and the trailing edge of the pulse which excites the last stage of the counter 20. In particular, such a frame of pulse signals is represented at the output amplifier by the wave form 103.

As is further represented in the drawing, the output amplifier 56 also includes means represented by a resistor 104 for inserting a negative pedestal into its output. As previously noted, this negative pedestal is useful in PAM operation in allowing a detection of output pulses having a relative zero magnitude. In particular, as commonly known, this negative pedestal may be inserted by clamping the output of an output transistor of the amplifier 56 to a negative potential.

As is further illustrated in the drawing, means are included for providing a master pulse having a zero magnitude when the apparatus of the present invention is being utilized to produce pulse duration modulated signals. As previously mentioned, in pulse duration modulation, the master pulse is indicated by an accurately timed space or pulse of zero amplitude. Thus in the present invention, switches 106 and 108 are provided which when actuated remove the portion of the circuit previously described in connection with the master pulse from the operation, thereby producing a master pulse having a zero magnitude. Further, since in pulse duration modulation the amplitude of all pulse signals is substantially equal, it is not necessary to detect the magnitude of zero level pulse signals. Accordingly, the negative pedestal producing portion of the circuit represented at 104 is also removed by operation of the switches 106 and 108.

From the above description it appears that the apparatus of the present invention provides a novel means for simulating a pulse train produced by a PAM or PDM commutator, such as that utilized in telemetering systems. In particular, this is accomplished by providing a pulse train in which each pulse is variable in amplitude and/or width. Further, since the pulse rate for PAM and PDM signals is different, the present invention provides a pulse train having a variable pulse rate. In particular, due to the variable timing of the clock pulse generator 26, the pulse rate for the pulse train may vary from 75 to 1,200 pulses per second.

Still further, to check for possible interaction between the stages of a decommutator the apparatus of the present invention provides means for selectively varying the amplitude and/or width of any pulse of the pulse train independent of all other pulse signals.

What is claimed is:

1. Apparatus for generating a train of pulses including a plurality of pulse frames each of which has a plurality of pulse signals and a single master pulse, one of said pulse signals being independently variable in amplitude and width, comprising: a pulse generating means having a variable pulse rate, said pulse generating means including means for generating pulse signals of variable time duration; a counter having a plurality of count conditions a count condition corresponding to each pulse of the pulse frame to be generated; means responsive to the leading edge of each pulse signal generated by said pulse generating means for advancing said counter through its count conditions in timed succession; gating means coupled to said pulse generating means; means responsive to said counter in a first count condition for opening said gating means to allow transmission of the pulse signals generated by said pulse generating means through said gating means to an output means; means for varying the amplitude of the pulse signals passed by said gating means to said output means; means for selecting a particular count condition of said counter to represent the pulse of the pulse frame which is independently variable; means responsive to the counter in said selected count condition for closing said gating means and generating a single pulse signal having a variable width; means for varying said single pulse in amplitude independent of all other pulse signals; means responsive to the counter in the count condition following said selected count condition for opening said gating means to allow transmission of the pulse signals generated by said pulse generating means to said output means; pulse forming means; means responsive to the counter in a count condition following the count condition which corresponds to the last pulse signal of said pulse frame for closing said gating means and energizing said pulse forming means to initiate said master pulse; means responsive to the trailing edge of the pulse signal the leading edge of which advances the counter to its last count condition for terminating said master pulse; and means for applying said master pulse to said output means.

2. Apparatus as defined in claim 1 wherein said means for terminating said master pulse includes a flip-flop, means responsive to the counter in its last count condition for exciting said flip-flop to a true state to produce an output signal, means responsive to the trailing edge of the pulse signal which advances the counter to its last count condition for exciting said flip-flop to a false state to terminate said flip-flop output signal, and means responsive to the trailing edge of said flip-flop output signal for de-energizing said pulse forming means.

3. The apparatus defined in claim 1 including switch means coupled between said pulse forming means and said output means for producing a master pulse having a zero magnitude.

4. A pulse generator circuit comprising: a pulse source; means synchronized with the pulse source for generating a train of pulses at one output terminal controllable in magnitude and duration; means including a recycling counter for periodically generating a master pulse of predetermined duration at the same output terminal after a selected number of pulses in the train have been generated; and means controlled by the counter for independently controlling the amplitude and duration of any one selected pulse in the train.

5. A pulse generating circuit comprising: a recycling counter having a plurality of count conditions; a pulse generating means coupled to said counter for generating pulse signals to advance said counter through its count conditions; means responsive to said counter in a first preselected count condition for generating a single pulse signal of variable time duration; means for independently varying the amplitude of said single pulse signal; means responsive to said counter in count conditions preceding and following said first preselected count condition for gating pulse signals generated by said pulse generating means in timed sequence ahead of and following said single pulse to an output means; and means responsive to said counter in a second preselected count condition for generating a master pulse of predetermined time duration to said output means after a selected number of pulse signals have been gated to said output means.

6. An arrangement for generating a train of pulses including a plurality of pulse frames each having a plurality of signal pulses and a single master pulse, a one of the signal pulses being independently variable in amplitude and width, comprising: a pulse generating means having a variable pulse rate, said pulse generating means including means for generating pulse signals of variable time duration; a recycling counter having a plurality of count conditions, a count condition corresponding to each pulse of the pulse frame to be generated; means responsive to the pulse signals generated by the pulse generating means for advancing said counter through its count conditions in timed succession; gating means coupled to said pulse generating means; means for selecting a particular count condition of said counter to correspond to the independently variable pulse of the pulse frame to be generated; means responsive to said counter in its count conditions which precede said particular count condition for opening said gating means for a period of time determined by the time required for said counter to advance through the count conditions preceding the particular count condition to allow transmission of pulse signals generated by said generating means through said gating means to an output means; means for varying the amplitude of the pulse signals transmitted through said gating means; means responsive to said counter in said particular count condition for closing said gating means and developing a single pulse signal of variable time duration; means for varying the amplitude of said single pulse signal and applying said single pulse signal to said output means; means responsive to said counter in its count conditions which follow said particular count condition and correspond to said signal pulses for opening said gating means for a period of time determined by the time required for said counter to advance through the count conditions corresponding to signal pulses which follow said particular count condition to allow transmission of pulses generated by said pulse generating means to pass through said gating means to said output means; means responsive to the counter in its count condition which follows the count condition corresponding to the last signal pulse of the pulse frame for initiating a master pulse signal, means responsive to said counter in its last count condition for terminating said master pulse signal; and means for applying said master pulse signal to said output means.

7. Apparatus for generating a train of pulses including a plurality of pulse frames each of which has a plurality of signal pulses and a single master pulse, one of the signal pulses being independently variable in amplitude and width, comprising: a pulse generating means having a variable pulse rate, said pulse generating means including means for generating pulse signals of variable time duration; a recycling counter having a plurality of count conditions, a count condition corresponding to each pulse of the pulse frame to be generated; means responsive to the pulse signals generated by said pulse generating means for advancing said counter through its count conditions in timed succession; gating means coupled to said pulse generating means; means responsive to said counter in a first count condition for opening said gating means to allow pulse signals generated by said pulse generating means to pass to an output means; means for varying the amplitude of the pulse signals passed by said gating means; means for selecting a particular count condition of said counter to represent the pulse of the pulse frame which is independently variable; means responsive to said counter in said particular count condition for closing said gating means and generating a single pulse signal having a variable width; means for varying the amplitude of said single pulse independent of all other pulse signals; means responsive to said counter in a count condition following said particular count condition for opening said gating means to allow transmission of pulse signals generated by said pulse generating means to said output means; means responsive to said counter in a count condition following the count condition which corresponds to the last signal pulse of said pulse frame for closing said gating means and exciting means for initiating said master pulse; means responsive to said counter in its final count condition for terminating said master pulse; and means for applying said master pulse to said output means.

8. Apparatus for generating a train of pulses including a plurality of pulse frames each of which has a plurality of signal pulses and a single master pulse, one of the pulses being independently variable in amplitude and width, comprising: a pulse generating means having a variable pulse repetition rate, the pulse generating means including means for generating pulse signals of variable time duration; a counter having a plurality of count conditions, a count condition corresponding to each pulse of the pulse frame to be generated; means responsive to the leading edge of each pulse signal generated by said pulse generating means for advancing said counter through its count conditions in timed succession; gating means coupled to said pulse generating means; means responsive to said counter in a first count condition for opening said gating means to allow the pulse signals generated by said pulse generating means to pass through said gating means to an output means; means for varying the amplitude of the pulse signals passed by said gating means; means for selecting a particular count condition of said counter to represent the pulse of the pulse frame which is independently variable; means responsive to said counter in the particular count condition for closing said gating means and generating a single pulse signal having a variable width; means coupled to said output means for independently varying the amplitude of said single pulse; means responsive to said counter in a count condition following said particular count condition for opening said gating means to allow transmission of the pulse signal generated by said pulse generating means to said output means; means responsive to said counter in a count condition following the count condition which corresponds to the last signal pulse of said pulse frame for closing said gating means and exciting means for initiating said master pulse; means for isolating the particular pulse signal generated by the pulse generating means the leading edge of which advances said counter to its final count condition; means responsive to the trailing edge of the particular pulse signal for terminating the master pulse signal; and means for applying said master pulse to said output means.

9. Apparatus for generating a train of pulses including a plurality of pulse frames each of which has a plurality of signal pulses and a single master pulse, one of the signal pulses being independently variable in amplitude and width, comprising: a pulse generating means having a variable pulse repetition rate, said pulse generating means including means for generating pulse signals of variable time duration; a recycling counter having a plurality of count conditions, a count condition of said counter being associated with each pulse of the pulse frame to be generated; means coupled to said pulse generating means for producing leading edge pulse signals conforming to the leading edges of the pulse signals generated by said pulse generating means; means for coupling said leading edge pulse signals to said counter to advance said counter through its count conditions in timed succession; means for selecting a particular count condition of said counter to be associated with the independently variable pulse of the pulse frame; means responsive to said counter in its count conditions which precede said particular count condition for gating a number of pulse signals generated by said pulse generating means to an output means, the number of pulse signals conforming to the number of count conditions preceding said particular count condition; means responsive to said counter in said particular count condition for generating a single pulse signal of variable time duration; means for independently varying the amplitude of the single pulse signal; means for applying said pulse signal to said output means; means responsive to said counter in its count conditions which follow said particular count condition and are associated with signal pulses of the pulse frame for gating a second number of pulse signals generated by said pulse generating means to said output means, said second number of pulse signals conforming to the number of signal pulses remaining in the pulse frame; means responsive to said counter in a count condition following the count condition associated with the last signal pulse of the pulse frame for initiating the master pulse signal; means responsive to said counter in its final count condition for generating a reproduction of the pulse signal the leading edge of which advances the counter to its final count condition; means responsive to the trailing edge of the reproduction for terminating said master pulse signal; and means for applying said master pulse signal to said output means.

10. Apparatus for generating pulse groups controllable in amplitude and duration at an output terminal, comprising: a pulse source having a variable pulse repetition rate; a recycling counter having a plurality of count conditions and driven by the pulses from said source; first gating means; means for opening said first gating means when the counter is in its initial count condition; means for closing the gating means when the counter is in any selected subsequent count condition of its cycle, the first gating means passing pulses from said source to the output terminal; means for controlling the amplitude and duration of pulses passed by the first gating means; means responsive to the counter for generating a single pulse when the counter reaches the selected count condition at which the first gating is closed; means for independently controlling the amplitude and duration of said single pulse; second gating means; means for opening the second gating when the counter is advanced to its next successive count condition; means for closing the second gating means when the counter is in a subsequent count condition in its cycle, the second gating means passing pulses from said source to the output terminal; means for controlling the amplitude and duration of pulses passed by the second gating means; means responsive to the counter for generating a single master pulse initiated when the counter reaches the select count condition at which the second gating means is closed; means responsive to the counter for terminating the master pulse when the counter is advanced to its final count condition in the cycle.

11. Apparatus for generating a train of pulses including a plurality of pulse frames each of which has a plurality of signal pulses and a single master pulse, one of the signal pulses being independently variable in amplitude and width, comprising: a pulse generating means having a variable pulse rate, the pulse generating means including means for generating pulse signals of variable time duration; a ring type counter having a plurality of stages, a stage corresponding to each pulse of the pulse frame to be generated; means responsive to the pulse signals generated by the pulse generating means for exciting each stage of the counter in timed succession; means responsive to an excitation of a first stage of the counter for opening a first electrical gate; means for applying the pulse signals generated by said pulse generating means to said first electrical gate; means for varying the amplitude of pulse signals passing through said first gate; means for applying pulse signals passing through said first gate to an output amplifier; means for selecting a particular stage of said counter to correspond to the independently variable pulse of the pulse frame; means responsive to an excitation of said particular stage for closing said first gate and generating a single pulse having a variable width; means for varying the amplitude of said single pulse independent of all other pulse signals; means for applying said single pulse to said output amplifier; means responsive to an excitation of a stage immediately following said particular stage for opening a second electrical gate; means for applying the pulse signals generated by said pulse generating means to said second gate; means for varying the amplitude of pulse signals passing through said second gate circuit; means for applying the pulse signals passing through said second gate to said output amplifier; means responsive to an excitation of a stage of said counter immediately following the stage corresponding to the last signal pulse of said pulse frame for closing said second gate and exciting means for initiating said master pulse; means responsive to an excitation of a last stage of said counter for terminating said master pulse; and means for applying said master pulse to said output amplifier.

12. Apparatus defined in claim 11 including means for providing a negative pedestal for said output amplifier.

References Cited in the file of this patent
UNITED STATES PATENTS 2,766,379    Pugsley  ---------------- Oct. 9, 1956
3,003,111    Smith  ------------------ Oct. 3, 1961